United States Patent [19]

Bond et al.

[11] Patent Number: 4,488,176

[45] Date of Patent: * Dec. 11, 1984

[54] METHOD OF AND APPARATUS FOR MODIFYING A VIDEO SIGNAL TO INHIBIT RECORDING THEREOF

[75] Inventors: John A. Bond; Yuan-Lu Li, both of Ottawa; Leslie J. Crane, Nepean, all of Canada

[73] Assignee: Northern Telecom Limited, Montreal, Canada

[*] Notice: The portion of the term of this patent subsequent to Jun. 28, 2000 has been disclaimed.

[21] Appl. No.: 309,593

[22] Filed: Oct. 8, 1981

Related U.S. Application Data

[63] Continuation-in-part of Ser. No. 246,878, Mar. 23, 1981, Pat. No. 4,390,898.

[51] Int. Cl.³ ............................................. H04N 5/38
[52] U.S. Cl. .................................. 358/141; 358/140; 358/319; 358/119; 360/33.1; 360/37.1
[58] Field of Search .......................... 360/33.1, 37.1; 358/114, 119, 120, 123, 140, 141, 319

[56] References Cited

U.S. PATENT DOCUMENTS

| | | | |
|---|---|---|---|
| 3,963,865 | 6/1976 | Songer | 178/7.1 |
| 4,100,575 | 7/1978 | Morio et al. | 358/120 |
| 4,276,565 | 6/1981 | Dalton et al. | 358/140 |
| 4,292,653 | 9/1981 | Bock et al. | 358/140 |
| 4,390,898 | 6/1983 | Bond et al. | 358/119 |

Primary Examiner—Joseph A. Orsino, Jr.
Attorney, Agent, or Firm—R. John Haley

[57] ABSTRACT

Video signal lines are added to or omitted from the ends of individual fields of a video signal to produce a modified video signal whose field length varies at a slow rate. The modified video signal can be broadcast and received by conventional television equipment, normal television reception and viewing being not noticeably affected by the variable field length. However, recording of the modified video signal is inhibited because the field length is not constant. The modified video signal is produced by directly modifying the scanning of televising equipment, or by storing the lines of the video signal in a store and reading them in a controlled manner therefrom. A decoder, for producing a constant field length video signal from the modified video signal, is also disclosed.

11 Claims, 8 Drawing Figures

METHOD OF AND APPARATUS FOR MODIFYING A VIDEO SIGNAL TO INHIBIT RECORDING THEREOF

This application is a continuation-in-part of U.S. patent application Ser. No. 246,878 filed Mar. 23, 1981 now U.S. Pat. No. 4,390,898 by J. A. Bond, Y. L. Li, and L. J. Crane, entitled "Scrambling and Unscrambling Video Signals In a Pay TV System", the entire disclosure of which is hereby incorporated herein by reference.

This invention relates to modifying a video signal to inhibit recording thereof on a video signal recorder, such as a video tape recorder (VTR), whilst still permitting reproduction of the video signal on a conventional broadcast television receiver.

In the prior art it has been proposed to modify a video signal in order to inhibit recording thereof by modifying the vertical blanking interval in certain respects. Thus in U.S. Pat. No. 3,963,865 all but one-and-a-half of the vertical synchronizing pulses in the vertical blanking interval are removed, the remaining one-and-a-half synchronizing pulses being sufficient for the proper operation of a television receiver but being insufficient for proper operation of a conventional VTR. In U.S. Pat. No. 4,100,575 the vertical blanking interval is modified by replacing some of the vertical synchronizing pulses and the following equalizing pulses with simulated equalizing pulses.

In these prior art arrangements, however, it is relatively easy to detect the modified vertical blanking intervals and replace them with locally generated standard vertical blanking intervals, thereby enabling unauthorized recording and/or reproduction of the video signal.

Accordingly, an object of this invention is to provide a method of and apparatus for modifying a video signal to inhibit recording thereof, which are less readily defeated or negated to allow unauthorised recording.

According to one aspect of this invention there is provided a method of modifying a video signal to inhibit recording thereof whilst permitting a television receiver to display a video picture in response to the modified video signal, comprising varying the length of fields of the video signal to produce the modified video signal with a varying field length.

As conventional VTRs rely for their operation on the normal constant field length of the video signal to be recorded, the modified video signal having a variable field length can not be recorded thereon. The variable field length of the modified video signal does not, however, noticeably affect normal television reception and viewing. Thus the modified video signal can be broadcast with little or no risk of recording and duplication.

Preferably the length of fields of the video signal is varied by selectively omitting lines from and adding lines to, e.g. by repeating lines at, the ends of individual fields of the video signal. To prevent picture jitter in conventional television reception of the broadcast modified video signal, preferably the length of fields of the video signal is varied at a rate which on average is not greater than one line per three fields.

To facilitate production of the modified video signal, preferably the length of fields of the video signal is varied so that a long-term average of the field lengths of the modified video signal is equal to the field length of the unmodified video signal.

In an embodiment of the invention described in detail below, the step of varying the length of fields of the video signal comprises storing video signal lines of the video signal to be modified sequentially in a memory and reading said lines from the memory, said lines being read generally sequentially but with lines being selectively omitted from and re-read from the ends of individual fields to produce respectively shortened or lengthened fields in the modified video signal.

The invention also extends to apparatus for converting between a video signal, comprising constant-length fields of video signal lines, and a modified video signal, comprising varying length fields of video signal lines, said apparatus comprising: a memory unit; means for storing the video signal lines of one of said video signals in the memory unit; means for reading video signal lines from the memory unit; and means for controlling the reading means to selectively omit lines from and add lines to individual fields of the video signal lines read from the memory unit whereby the video signal lines read from the memory unit constitute the other of said video signals.

Such apparatus can comprise an encoder at a television transmission station for converting a normal video signal to a modified video signal prior to broadcasting, or it can comprise a decoder at a receiving station for converting a received modified video signal back to a constant field length video signal which can be recorded on a VTR. However, such a decoder would normally be far too expensive to justify its provision at a receiving station.

According to another aspect of this invention there is provided apparatus for modifying a video signal comprising fields of video signal lines to inhibit recording thereof whilst permitting a television receiver to display a video picture in response to the modified video signal, said apparatus comprising: a memory unit; means for storing the video signal lines of the video signal in the memory unit; means for reading the video signal lines from the memory unit; and means for controlling the reading means to selectively omit lines from and add lines to individual fields of the video signal lines read from the memory unit whereby the video signal lines read from the memory unit constitute a modified video signal having a varying field length.

Preferably the memory unit serves to store digital signals, the storing means comprises means for converting the video signal from an analog signal to digital signals, and the reading means comprises means for converting digital signals read from the memory unit to an analog signal to constitute the modified video signal.

Preferably the control means comprises means for storing a memory address relating to the storage in the memory unit of the vertical interval in each field of the video signal, and means responsive to each such stored memory address for selectively controlling the reading means to omit lines from or re-read lines at the end of the previous field of the video signal stored in the memory unit to produce the modified video signal.

The invention will be further understood from the following description with reference to the accompanying drawings, in which.

Figure 1:
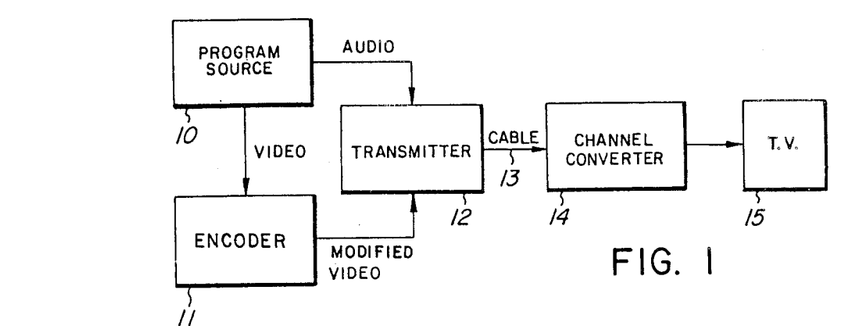
FIG. 1 shows a block diagram of a TV transmission system including a video signal encoder which operates in accordance with this invention to produce a modified video signal.

Referring to FIG. 1, there is shown therein a TV transmission system in which video signals from a program source 10 are modified by a video signal encoder 11, the resultant modified video signals and audio signals from the program source being supplied to a transmitter 12 for broadcasting. The audio signal path from the program source 10 to the transmitter 12 may also include a delay unit (not shown), for example providing a signal delay of 30 ms (the duration of one television field), to keep the timing of the transmitted audio signals matched to the average timing of the modified video signals. The broadcast signals are illustratively broadcast via a cable 13, but they could alternatively be supplied by electromagnetic radiation, directly or via a satellite link. As illustrated, the broadcast signals are supplied optionally via a conventional channel converter 14, to a conventional television receiver 15 to be reproduced in conventional manner.

As described in detail below, the encoder 11 modifies the video signal by providing it with a variable field length. The variation in the field length is insufficient to adversely affect normal reproduction of the TV signal by the receiver 15, and is not noticeable during normal viewing, but prevents recording of the video signal on, for example, a video tape recorder.

Figure 2:
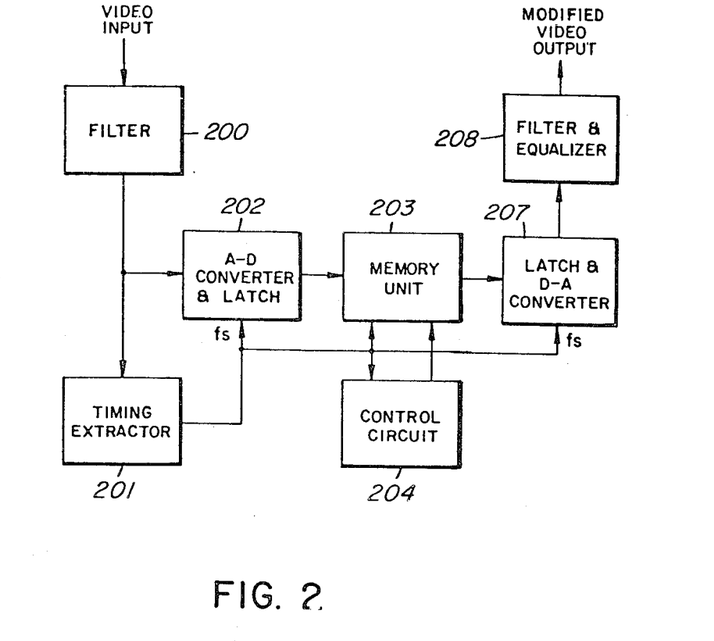
FIG. 2 shows a block diagram of the video signal encoder which includes a timing extractor, a memory unit, and a control circuit.

FIG. 2 shows a block diagram of the encoder 11. The video input signal from the program source 10 is conducted via a 4.2 MHz low-pass anti-aliasing filter 200 to a timing extractor 201 and to the input of an analog-digital (A–D) converter and latch 202. The A-D converter samples the analog video signal at a frequency fs, supplied by the timing extractor 201, and equal to four times the video signal color subcarrier frequency fb, and linearly converts each sample into an 8-bit digital value which is stored in the latch. This gives 910 digital samples per horizontal line, for an NTSC video signal for which the color subcarrier frequency fb is 3.579545 MHz. These digital samples are written into, and subsequently read from, a memory unit 203 under the control of a control circuit 204. Digital samples read from the memory unit 203 are supplied to a latch and digital-analog converter 207, which operates at the frequency fs to latch the digital values supplied thereto and to convert them into an analog video signal. This analog video signal is filtered and equalized in a 4.2 MHz low-pass filter and a (sin x)/x equalizer, shown as a single block 208, whose output constitutes the modified video output signal. The timing extractor 201 supplies various timing signals to the units 203 and 204, as well as the signal fs to the units 202 and 207.

Figure 3:
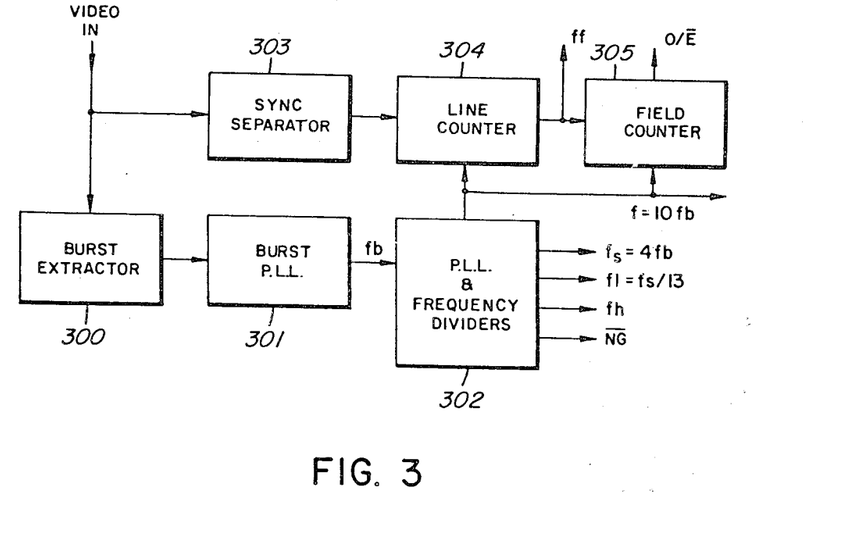
FIG. 3 shows a block diagram of the timing extractor.

The timing extractor 201 is shown in greater detail in FIG. 3. A color burst extractor 300 extracts the color burst from each horizontal line of the incoming video signal and supplies it to a color burst phase locked loop (PLL) 301, which regenerates the color burst frequency fb. This is supplied to a further PLL including an oscillator having a frequency 40 fb, whose output is frequency divided to produce the various frequency signals indicated in FIG. 3 and described below. This further PLL and the frequency dividers are shown as a single block 302. The incoming video signal is also supplied to a sync separator 303, which derives the composite sync signals from the video signal and triggers a line counter 304 to count the horizontal lines of each field. The output signal ff of the line counter 304, which is a logic 0 during each vertical interval, is frequency-divided by two in a field counter 305 to produce a signal O/E which changes state each field, and whose state thus corresponds to the phase of the color burst of the incoming video signal. The counters 304 and 305 are synchronized by a signal f produced in the block 302 and having ten times the color subcarrier frequency fb. The block 302 also produces the signal fs=4fb already described, a signal fl having a frequency which is one-thirteenth the frequency fs, a signal fh having the horizontal line frequency, and a signal $\overline{NG}$ also having the horizontal line frequency and which is a logic 0 during each horizontal line sync pulse of the video signal. Thus the various timing signals have the following frequencies:

| f  = 35.79545 MHz | fh = $\overline{NG}$ = 15.734 kH |
|---|---|
| fs = 14.31818 MHz | ff = 59.94 Hz |
| fl =  1.1014 MHz  | O/E = 29.97 Hz |

Figure 4:
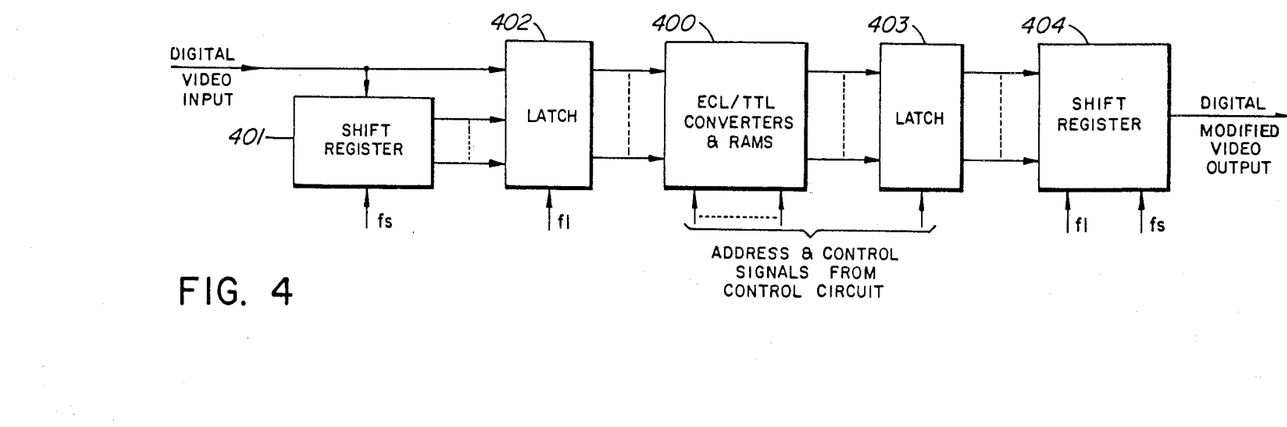
FIG. 4, which is on the same sheet as FIG. 1, shows a block diagram of the memory unit.

FIG. 4 illustrates the memory unit 203 in greater detail. This unit comprises 104 TTL 64 kbit RAMs (random access memories), together with associated ECL to TTL and TTL to ECL coverters, shown as a single block 400. The RAMs are cyclically controlled and addressed, by address and control signals supplied by the control circuit 204, for write-in and read-out of the digital video signal. In view of the relatively slow speed of each memory access cycle, the digital video signal is written into and read from the RAMs 13 8-bit words at a time, 1 bit of each word being written into or read from a respective one of the 104 RAMs. Accordingly, the 8-bit video signal words from the A-D converter and latch 202 are shifted into a shift register 401 under the control of the signal fs, and the words are transferred 13 at a time to a latch 402 under the control of the signal fl, to be written into the RAMs. Conversely, the 8-bit words are read out from the RAMs and stored in an output latch 403 13 at a time under the control of the control circuit 204, and are loaded in parallel from the latch 403 into a shift register 404 under the control of the signal fs to constitute the digital modified video output of the memory unit 203. The number of 13 words written into and read from the RAMs is selected in view of the speed of the RAMs and the number of 910 samples per horizontal line of the video signal, to provide a convenient number of 70 memory access cycles each horizontal line.

Figure 5:
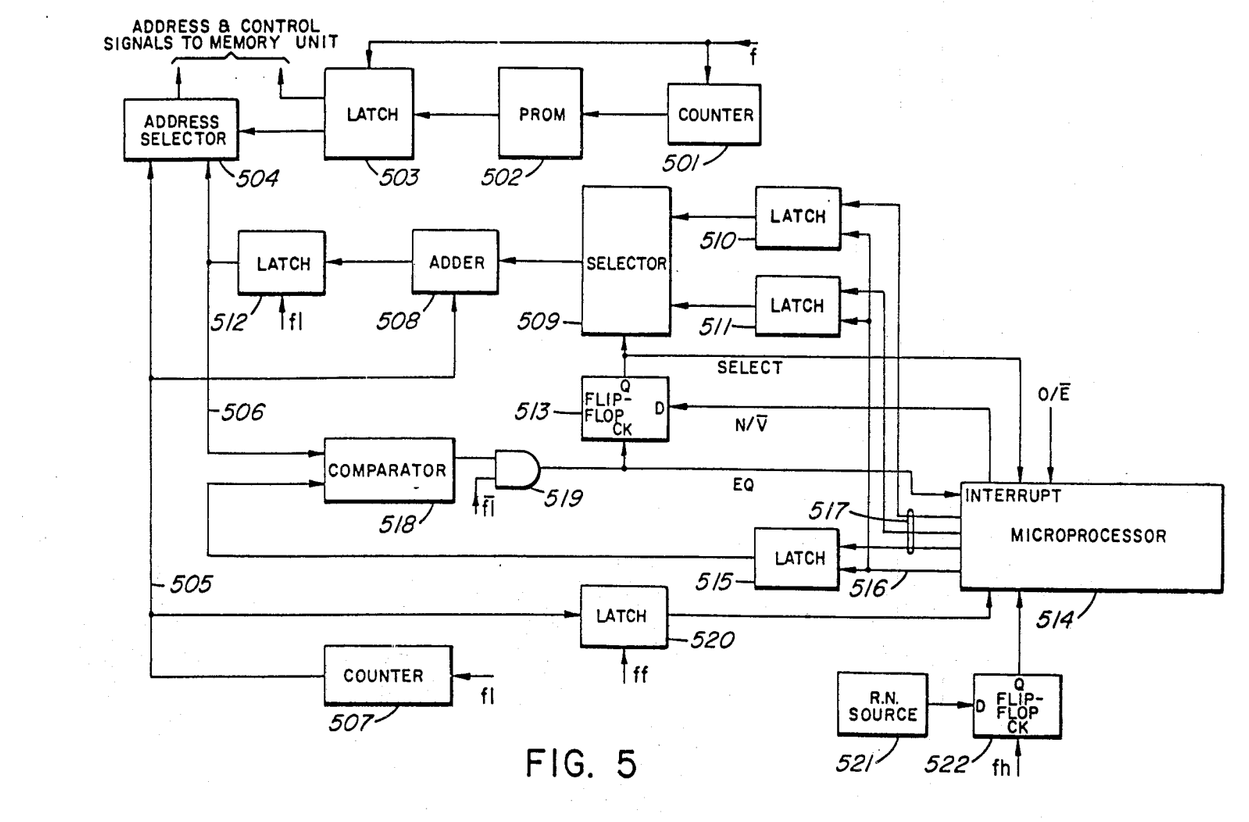
FIG. 5 shows a block diagram of the control circuit.

The control circuit 204 is shown in FIG. 5. The control circuit 204 includes a modulo-65, counter 501, a PROM 502, and a latch 503 for producing control signals and selecting address signals, by means of an address selector 504, for each memory access cycle. The counter 502 is clocked by the signal f to increment its count, and for each count the PROM 502 is addressed to produce a set of control signals which are latched in the latch 503 under the control of the signal f. The control signals in the latch 503 control the cyclical operation of the RAMs (block 400) and latch 403 of the memory unit and the selection of a write address from a bus 505 or a read address from a bus 506 for supply to the RAMs.

The write address on the bus 505 is produced by a 16-bit synchronous counter 507 which is clocked by the signal fl, so that the incoming video signal words are written cyclically into successive memory locations. The read address on the bus 506 is produced by adding to the current write address, in a modulo $2^{16}$ adder 508, an offset which is selected by a selector 509 from a latch 510 or a latch 511, and latching the sum in a latch 512 under the control of the signal fl. The selector 509 is controlled by a signal 'SELECT' produced at the Q output of a D-type flip-flop 513, which signal is also supplied to a microprocessor 514. The microprocessor 514 supplies the offsets to the latches 510 and 511, and supplies a read address to a latch 515, via a common bus 516 under the control of respective latch loading signals on lines 517. The microprocessor also supplies a signal N/V to the data input D of the flip-flop 513. A comparator 518 compares the read address on the bus 506 with the read address stored in the latch 515 and, when the compared addresses are the same, produces an output signal which is gated with the signal fl in an AND gate 519 to produce a signal EQ which is supplied to the clock input CK of the flip-flop 513 and as an interrupt signal to the microprocessor 514. The microprocessor 514 is also supplied with a vertical interval start address from a latch 520; this is the write address on the bus 505 which exists at the start of a vertical interval of the video signal and which is latched in the latch 520 under the control of the signal ff.

The control circuit 204 also includes a random noise source 521 and a flip-flop 522. A random noise signal, such as the noise voltage of a diode or resistor constituting the source 521, is clocked by the signal fh to the Q output of the flip-flop 522, which output is coupled to the microprocessor 514.

The control circuit 204 operates as follows. As already explained, the incoming video signal words are written cyclically into the memory, and the start address of each vertical interval is stored in the latch 520. Reading of the video signal words from the memory takes place generally sequentially after a delay, or offset, which is determined by the signal SELECT to supply the offset from one of the latches 510 and 511 to the adder 508, where the selected offset is added to the write address to produce the read address. Each offset is an integral multiple of 70, so that video signal lines are read from the memory a whole number of line periods after being written into the memory.

From each vertical interval start address which it obtains from the latch 520, as described more fully below the microprocessor 514 determines a read address at which the offset may be changed and stores this read address in the latch 515, and determines an appropriate offset and stores this in that one of the latches 510 and 511 which is not currently selected by the selector 509. With continued reading from the memory, the comparator 518 eventually detects equality of the current read address produced by the latch 512 and the read address stored in the latch 515, in response to which the signal EQ becomes 1 and then again becomes 0 with the next falling edge of the signal fl supplied to the gate 519. This 1-to-0 transition of the signal EQ triggers the flip-flop 513 via its clock input CK, to transfer the logic level of the signal N/V at its D input to its Q output, whereby the logic level of the signal SELECT is changed and the offset stored in the previously non-selected latch 510 or 511 is selected by the selector 509. The 1-to-0 transition of the signal EQ also constitutes an interrupt to the microprocessor 514. In response to the interrupt, the microprocessor 514 reads the new state of the signal SELECT, supplies to the latch 515 a new read address which it has determined and sets the signal N/V to be opposite to the new state of the signal SELECT. The new address which is latched in the latch 515 is different from the current read address, so that the comparator 518 no longer detects equality and the signal EQ remains 0.

The microprocessor 514 determines the offsets for the latches 510 and 511 and the read addresses for the latch 515 in order to achieve the desired variation of the field length of the video signal. The direction of each change of the field length, i.e. whether the field is shortened or lengthened, is determined by the output of the flip-flop 522. The field length variation is effected by not reading or by re-reading the last, for example, 2 or 4 lines of a particular field, whereby the field in the modified video signal is respectively shortened or lengthened by 2 or 4 lines. It has been found that progressive changes in the field length of the modified video signal achieved in this manner, within the limits imposed by the size of the memory and whilst maintaining a long-term average of 525 lines per frame, do not adversely affect reproduction by a conventional television receiver of a television picture from the modified video signal. Although the variable field length results in lines being omitted from or repeated at the bottom of the reproduced picture, this is insignificant and not normally noticeable because normal television receivers are arranged to overscan by several lines. In order to avoid objectionable picture jitter due to the changing field length, the microprocessor 514 is arranged to change the field length relatively slowly. It has been found that changing the length of one frame (two fields) by two lines, with at least two frames between such changes, results in a subjectively negligible picture jitter. In other words, the average rate of change of the field length is typically not greater than one line per three fields.

Figure 6:
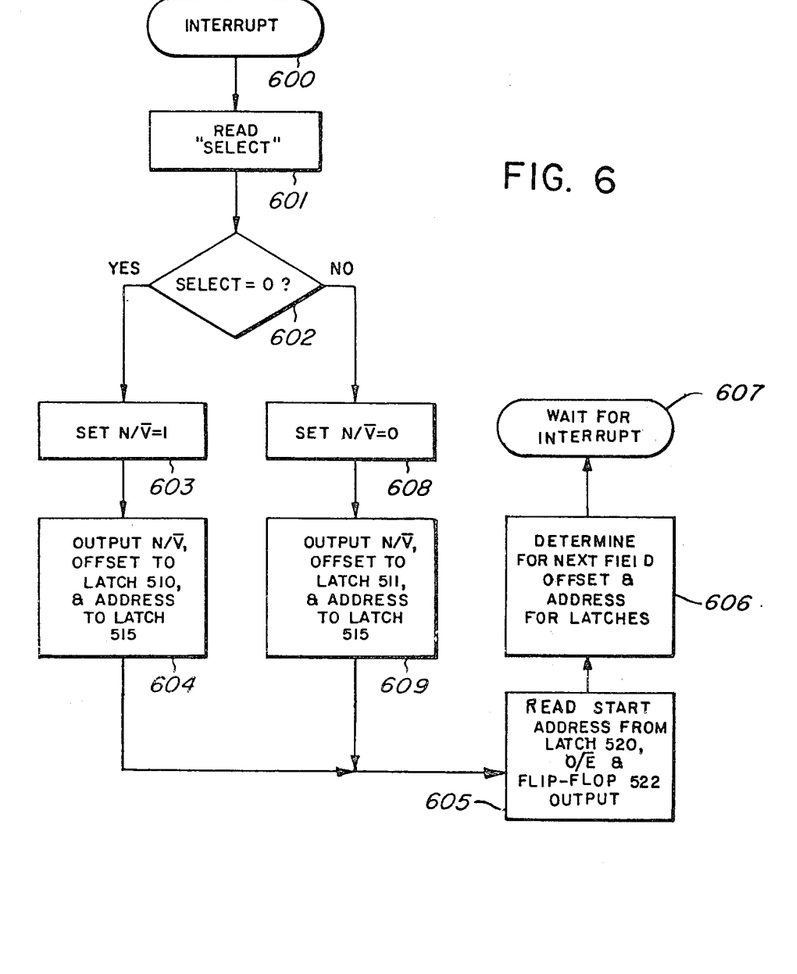
FIG. 6 is a flow chart illustrating the operation of the control circuit.

The operation of the control circuit 204 is explained further below by way of example and with reference to the flow chart in FIG. 6. It is assumed for example that the signal SELECT = 1 for reading from the memory a particular field using an offset contained in the latch 510. It is also assumed that this field is to have the conventional number of 262½ lines, and that accordingly the microprocessor 514 has previously stored the vertical interval start address of the next field, obtained from the latch 520, in the latch 515, and has stored the same offset in the latch 511 as is contained in the latch 510. It is further assumed that the microprocessor has previously determined from the latch 520 the vertical interval start address of the next-but-one field and has read the output of the flip-flop 522 and the signal O/E. The latter signal is supplied to the microprocessor 514 to ensure that the omission and duplication of lines in the modified video signal does not disrupt the normal phase sequence of the color subcarrier reference burst contained in the video lines.

If the output of the flip-flop 522 indicates that the next field is to be shortened, for example by two lines, the microprocessor determines as the next address for the latch 515 the vertical interval start address of the next-but-one vertical interval reduced by an amount equivalent to two video signal lines, and determines as the next offset for the latch 510 an offset equal to the offset stored in the latch 511 increased by an amount equivalent to two video signal lines. If, on the contrary, the output of the flip-flop 522 indicates that the next field is to be lengthened, for example by two lines, the microprocessor determines the vertical interval start address of the next-but-one field as the next address for the latch 515, and determines as the next offset for the latch 510 an offset equal to the offset stored in the latch 511 reduced by an amount equivalent to two video signal lines.

When the current read address reaches the vertical interval start address in the latch 515, the comparator 518 establishes an identity, the flip-flop 513 is clocked to change the signal SELECT to 0 in accordance with the signal N/V̄=0 supplied at this time by the microprocessor 514, and an interrupt (block 600, FIG. 6) to the microprocessor is generated. With the new signal SELECT=0 the selector 509 selects the offset from the latch 511 for continued reading from the memory, but as this offset is the same as that in the latch 510 reading continues sequentially.

In response to the interrupt, the microprocessor reads (block 601) the signal SELECT and determines (block 602) its new state. In this case the signal SELECT=0, in response to which the microprocessor 514 sets (block 603) the signal N/V̄ to 1 (opposite to the signal SELECT) and then outputs (block 604) this new value of the signal N/V̄, the determined offset to the latch 510, and the determined address for the latch 515 to this latch. Subsequently the microprocessor reads (block 605) another vertical interval start address from the latch 520, and also reads the signal O/E and the output of the flip-flop 522. From this information the microprocessor determines (block 606) the next offset for the latch 511 and the next address for the latch 515, as already described. For example, if the next field is to have the usual length of 262½ lines, the microprocessor uses the relevant vertical interval start address for the latch 515 and the same offset as is in the latch 510 for the latch 511. The microprocessor 514 then waits (block 607) for the next interrupt, in response to which the above sequences are repeated to the block 602. As now the signal SELECT=1, a block 608 is reached in which the signal N/V̄ is set to 0, and then in a block 609 this signal N/V̄ and the determined offset for the latch 511 and address for the latch 515 are output to these latches, thereby reaching the block 605. The above sequences are repeated as described above.

From the description above it should be appreciated that, for a field which is to be shortened for example by two lines, the comparator 518 establishes an identity, and the interrupt is generated, two lines before the start of the next vertical interval, and as a result of the switch-over of the selector 509 the offset is changed suddenly by two lines so that reading continues with this next vertical interval. Thus the last two lines of the field are not read from the memory. Conversely, for a field which is to be lengthened for example by two lines, the comparator establishes an identity, and the interrupt is generated, at the start of the next vertical interval, and as a result of the switch-over of the selector 509 the offset is changed suddenly by two lines so that the last two lines of the field are read again from the memory before reading continues with the vertical interval. Thus the field length of the modified video signal is varied by omitting lines from or adding duplicated lines to the end of individual fields. As has already been observed, this variation of the field length, if effected slowly as described, is not noticeable in the normal reproduction and viewing of the video signal on a conventional television receiver, but prevents recording of the video signal on video tape recorders which rely for their operation on the video signal to be recorded having a constant field and frame length.

Figure 7:
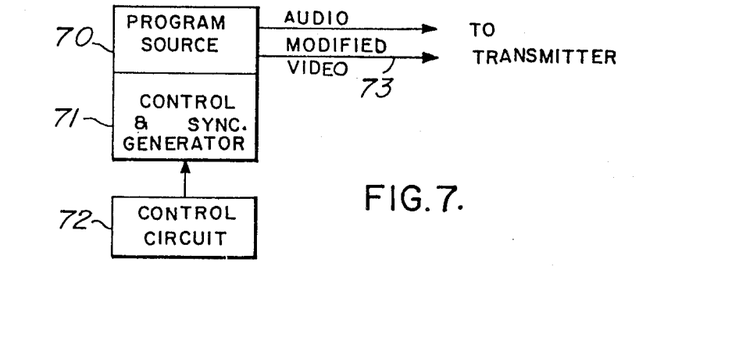
FIG. 7 shows a block diagram of a simplified form of video signal encoder specifically for use where the TV program source is at the same location as the encoder.

FIG. 7 illustrates a modified and simplified form of the arrangement described above, which can be used where a television program source 70, which includes a control and synchronizing pulse generator unit 71, is located at the same location as the encoding equipment, which in this case consists of a control unit 72. In this case the television picture image is continuously available from the program source 70, which for example comprises a studio television camera or a cine film so that the memory unit 203 described above, and the associated conversion and latching circuitry, can be dispensed with.

Accordingly, in the arrangement of FIG. 7 the control unit 72 directly controls the unit 71 to provide the modified video signal on a line 73 with the described variable field length. This control is effected in real time by directly controlling a video line counter of the unit 71 to modify the field length by omitting scanning or duplicating scanning of video lines. Accordingly, the video signal on the line 94 is directly modified.

As explained above, the modified video signal can not be recorded on a video tape recorder because it has a variable field and frame length. Unlike the prior art arrangements, in which reconstruction of the normal vertical interval can be easily effected at low cost, thereby enabling recording of the video signal and defeating the encoding process, the modified video signal of the present invention can not be readily and economically converted to a form suitable for recording. In fact, a decoder for converting the modified video signal to a suitable form for recording must be virtually as complicated as the encoder described above with reference to FIGS. 1 to 6. Whilst the expense of a single encoder as described above can be justified for a television transmission system, the comparable expense of a decoder for individual use with a video tape recorder would generally be considered exorbitant.

Figure 8:
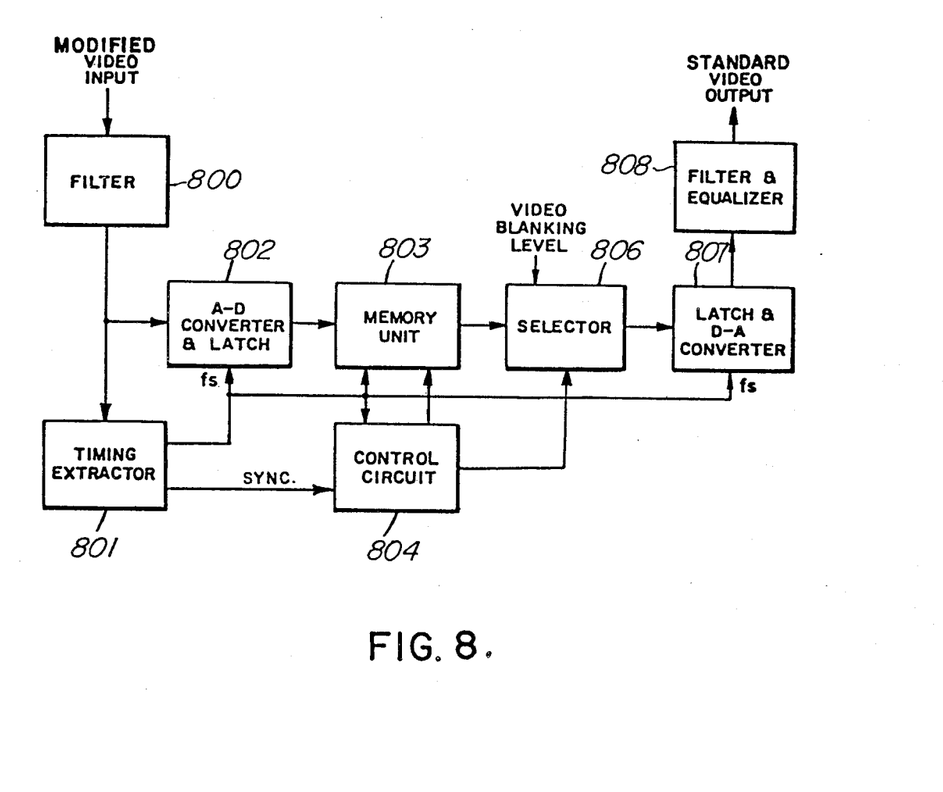
FIG. 8 shows a block diagram of a video signal decoder which may be provided to decode the modified video signal to enable recording thereof.

FIG. 8, however, illustrates in a block diagram a possible form of such a decoder, which comprises a low pass filter 800, timing extractor 801, A-D converter and latch 802, memory unit 803, control circuit 804, latch and D-A converter 807, and a filter and equalizer 808, which are arranged in a similar manner to the arrangement of the encoder as shown in FIG. 2. In addition, the decoder comprises a selector 806 which is controlled by the control circuit 804 to supply a video blanking level to the unit 807 to replace lines which are omitted from the modified video signal. As illustrated, the control circuit 804 is supplied with synchronizing signals from the timing extractor 801, from which it determines the locations of omitted and duplicated lines in the modified video signal. From this description and the foregoing description of the manner in which the encoder operates, it will be apparent to those skilled in the art how the decoder may be implemented in detail to produce a standard video signal from the modified video signal.

Although particular embodiments of the invention have been described in detail, numerous changes, adaptations, and variations may be made without departing from the scope of the invention, which is defined in the claims.

What is claimed is:

1. A method of modifying a video signal to inhibit recording thereof whilst permitting a television receiver to display a video picture in response to the modified video signal, comprising varying the length of fields of the video signal to produce the modified video signal with a varying field length.

2. A method as claimed in claim 1 wherein the length of fields of the video signal is varied by selectively omitting lines from and adding lines to the ends of individual fields of the video signal.

3. A method as claimed in claim 2 wherein the step of adding lines to the ends of individual fields of the video signal comprises repeating lines of said fields.

4. A method as claimed in any of claims 1 to 3 wherein the length of fields of the video signal is varied at a rate which on average is not greater than one line per three fields.

5. A method as claimed in any of claims 1 to 3 wherein the length of fields of the video signal is varied so that a long-term average of the field lengths of the modified video signal is equal to the field length of the unmodified video signal.

6. A method as claimed in claim 1 wherein the step of varying the length of fields of the video signal comprises storing video signal lines of the video signal to be modified sequentially in a memory and reading said lines from the memory, said lines being read generally sequentially but with lines being omitted from and re-read from the ends of individual fields to produce respectively shortened or lengthened fields in the modified video signal.

7. Apparatus for converting between a video signal, comprising constant-length fields of video signal lines, and a modified video signal, comprising varying length fields of video signal lines, said apparatus comprising:
a memory unit;
means for storing the video signal lines of one of said video signals in the memory unit;
means for reading video signal lines from the memory unit; and
means for controlling the reading means to selectively omit lines from and add lines to individual fields of the video signal lines read from the memory unit whereby the video signal lines read from the memory unit constitute the other of said video signals.

8. Apparatus for modifying a video signal comprising fields of video signal lines to inhibit recording thereof whilst permitting a television receiver to display a video picture in response to the modified video signal, said apparatus comprising:
a memory unit;
means for storing the video signal lines of the video signal in the memory unit;
means for reading the video signal lines from the memory unit; and
means for controlling the reading means to selectively omit lines from and add lines to individual fields of the video signal lines read from the memory unit whereby the video signal lines read from the memory unit constitute a modified video signal having a varying field length.

9. Apparatus as claimed in claim 8 wherein the memory unit serves to store digital signals, the storing means comprises means for converting the video signal from an analog signal to digital signals, and the reading means comprises means for converting digital signals read from the memory unit to an analog signal to constitute the modified video signal.

10. Apparatus as claimed in claim 8 or 9 wherein the control means comprises means for storing a memory address relating to the storage in the memory unit of the vertical interval in each field of the video signal, and means responsive to each such stored memory address for selectively controlling the reading means to omit lines from or re-read lines at the end of the previous field of the video signal stored in the memory unit to produce the modified video signal.

11. A method of converting a modified video signal, comprising varying length fields of analog video signal lines, to an analog video signal of constant field length, comprising converting the analog video signal lines to digital signals, storing the digital signals in a memory unit, reading the digital signals from the memory unit at a constant field rate by selectively omitting digital signal lines from and adding digital signal lines to the digital signals read from the memory unit, and converting the resultant digital signals to said analog video signal of constant field length.

* * * * *